(12) United States Patent
Fujikata et al.

(10) Patent No.: US 9,341,868 B2
(45) Date of Patent: May 17, 2016

(54) SILICON-BASED ELECTRO-OPTICAL DEVICE

(71) Applicant: NEC Corporation, Tokyo (JP)

(72) Inventors: Junichi Fujikata, Tokyo (JP); Shigeki Takahashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/388,249

(22) PCT Filed: Mar. 14, 2013

(86) PCT No.: PCT/JP2013/057270
§ 371 (c)(1),
(2) Date: Sep. 26, 2014

(87) PCT Pub. No.: WO2013/146317
PCT Pub. Date: Oct. 3, 2013

(65) Prior Publication Data
US 2015/0049978 A1    Feb. 19, 2015

(30) Foreign Application Priority Data

Mar. 30, 2012  (JP) .................................. 2012-080451

(51) Int. Cl.
*G02F 1/035*  (2006.01)
*G02F 1/025*  (2006.01)
(Continued)

(52) U.S. Cl.
CPC ................ *G02F 1/025* (2013.01); *G02F 1/225* (2013.01); *G02F 1/2257* (2013.01); *G02F 2001/0152* (2013.01); *G02F 2001/212* (2013.01); *G02F 2202/104* (2013.01)

(58) Field of Classification Search
CPC . G02F 1/225; G02F 2001/212; G02F 1/2255; G02F 1/025; G02F 1/2257; G02F 1/035
USPC .............................................. 385/1, 2, 3, 4, 8
See application file for complete search history.

(56) References Cited

U.S. PATENT DOCUMENTS

| 5,595,916 A * | 1/1997 | Fujimura ........... G01B 11/0625 250/341.4 |
| 7,308,160 B2 * | 12/2007 | Gill ......................... G02F 1/025 385/129 |
| 7,596,165 B2 * | 9/2009 | Johnson ................. B82Y 20/00 372/43.01 |

FOREIGN PATENT DOCUMENTS

| JP | 2005-024891 | 1/2005 |
| JP | 2006-515082 | 5/2006 |

(Continued)

OTHER PUBLICATIONS

International Search Report PCT/JP2013/057270 dated Jun. 25, 2013.

(Continued)

*Primary Examiner* — Jennifer Doan
(74) *Attorney, Agent, or Firm* — Young & Thompson (57) ABSTRACT

In a region in which silicon semiconductor layers having first and second conductive types are stacked, a concavoconvex structure including a $Si_{1-x}Ge_x$ (x=0.01 to 0.9) layer is formed on a surface of the first silicon semiconductor layer, a relatively thin dielectric is formed on the concavoconvex structure, and a silicon semiconductor layer having the second conductive type is further stacked.

23 Claims, 9 Drawing Sheets

(51) Int. Cl.
*G02F 1/225* (2006.01)
*G02F 1/015* (2006.01)
*G02F 1/21* (2006.01)

(56) References Cited

FOREIGN PATENT DOCUMENTS

| JP | 2010-206768 | 9/2010 |
| WO | 2004088394 | 10/2004 |
| WO | 2010055826 | 5/2010 |

OTHER PUBLICATIONS

William M.J. Green et al., "Ultra-compact, low RF power, 10 Gb/s silicon Mach-Zehnder modulator", Optics Express, The Optical Society, Dec. 2007, vol. 15, Issue 25, p. 17106-17113.

* cited by examiner

PRIOR ART

FIG. 15

PRIOR ART

SILICON-BASED ELECTRO-OPTICAL DEVICE

TECHNICAL FIELD

The present invention relates to a silicon-based electro-optical device that is necessary in fields of information processing and communication, and converts a high-speed electrical signal into an optical signal at a high speed, and more particularly, to a silicon-based electro-optical device using a capacitor structure including silicon-insulator-silicon formed on a silicon-on-insulator (SOI) substrate so that a sufficient high-speed operation can be performed.

BACKGROUND ART

In various systems such as optical fibers for home use and a local area network (LAN), a silicon-based optical communication device operating at an optical fiber communication wavelength of 1330 nm or 1500 nm is a very promising technique capable of enabling an optical functional element and an electronic circuit to be integrated on a silicon platform using a complementary metal oxide semiconductor (CMOS) technique.

In recent years, extensive research has been conducted on silicon-based passive devices such as waveguides, optical couplers, and wavelength filters. Further, as an important technique by which an optical signal for a communication system can be operated, there are silicon-based active devices such as optical modulators and optical switches, and such active devices are receiving much attention. However, optical modulators and optical switches that change a refractive index using a thermo-optical effect of silicon are low in speed, and can be used only at a device speed of up to a modulation frequency of 1 Mbps. Thus, in order to implement a high modulation frequency required in many optical communication systems, an optical modulator or an optical switch using an electro-optical effect of enabling a high-speed operation is required.

In the case of pure silicon, a linear electro-optical effect (Pockels effect) does not occur and a change in the refractive index of pure silicon by a Franz-Keldysh effect or a Kerr effect is very small. For this reason, most electro-optical modulators currently proposed change a real part and an imaginary part of the refractive index and change the phase and intensity of light propagated through a silicon layer by changing the free carrier density of the silicon layer using a carrier plasma effect. In a modulator using such free carrier absorption, the intensity of output light is directly modulated by a change in absorption of light propagated through a silicon layer. Further, as a structure using a change in refractive index, a structure using a Mach-Zehnder interferometer is common. In a Mach-Zehnder interferometer of a waveguide type, an intensity modulation signal of light is obtained by performing propagation through two arms based on a change in a refractive index or giving a phase difference between light beams and causing light beams to interfere with each other.

In an electro-optical modulator, a free carrier density can be changed by injection, accumulation, removal, or inversion of free carriers. However, in most electro-optical modulators already under review, optical modulation efficiency is poor, a length (hereinafter referred to simply as an "optical phase modulation length") necessary for optical phase modulation is a millimeter (mm) order, and an injection current density higher than 1 kA/cm$^3$ is necessary. In the case of an electro-optical modulator, when an optical phase modulation length is long and an element size is large, it is easily affected by a temperature distribution on a silicon platform, and an original electro-optical effect is likely to be removed due to a change in a refractive index of a silicon layer caused by a thermo-optical effect. Thus, in order to implement miniaturization, high integration, and low power consumption in an electro-optical modulator, an element structure having high optical modulation efficiency is required.

As an electro-optical modulator satisfying the above requirements, for example, a silicon-based electro-optical device including a rib waveguide structure on an SOI substrate is disclosed in Non-Patent Document 1. In the silicon-based electro-optical device disclosed in Non-Patent Document 1, slab regions extending in a traverse direction at both sides of a rib waveguide structure including an intrinsic semiconductor region are doped to have a p type and an n type, respectively.

Figure 14:
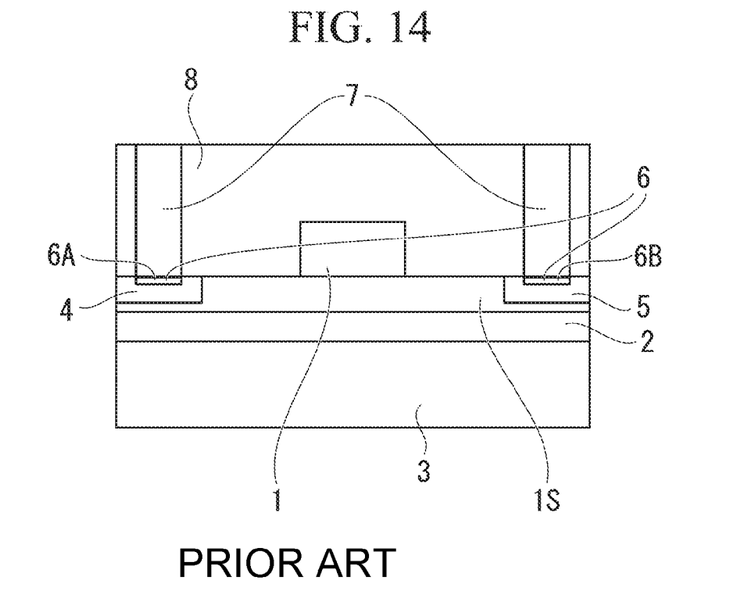
FIG. 14 is a cross-sectional view of a silicon-based electro-optical device disclosed in Non-Patent Document 1.

The rib waveguide structure is formed using a silicon layer 1S on an SOI substrate including a support substrate 3 made of silicon and an embedding oxide layer 2 as illustrated in FIG. 14. The rib waveguide structure is a PIN diode modulator, and is a structure in which a free carrier density in an intrinsic semiconductor region is changed by applying forward and reverse biases, and a refractive index is changed using a carrier plasma effect. In the PIN diode modulator of FIG. 14, intrinsic semiconductor silicon 1 is formed to include p+ doped semiconductor silicon 4 formed by performing a doping process on the silicon layer 1S coming in contact with a first electrode contact layer 6A at a high concentration. Further, the intrinsic semiconductor silicon 1 includes n+ doped semiconductor silicon 5 formed by performing a doping process on the silicon layer 1S at a high concentration and a second electrode contact layer 6B coming in contact with the n+ doped semiconductor silicon 5.

The p+ and n+ doped semiconductor silicon 4 and 5 is subjected to a doping process showing a carrier density of about 10$^{20}$ per cubic centimeter (cm$^3$).

In the rib waveguide structure illustrated in FIG. 14, the first and second electrode contact layers 6A and 6B are connected to a power source (not shown) via an electrode interconnection 7. As a forward bias is applied to the PIN diode using the first and second electrode contact layers 6A and 6B, free carriers are injected into the waveguide. Then, as free carriers increase, the refractive index of the intrinsic semiconductor silicon 1 changes, and thus phase modulation of light propagated in the waveguide is performed.

Figure 15:
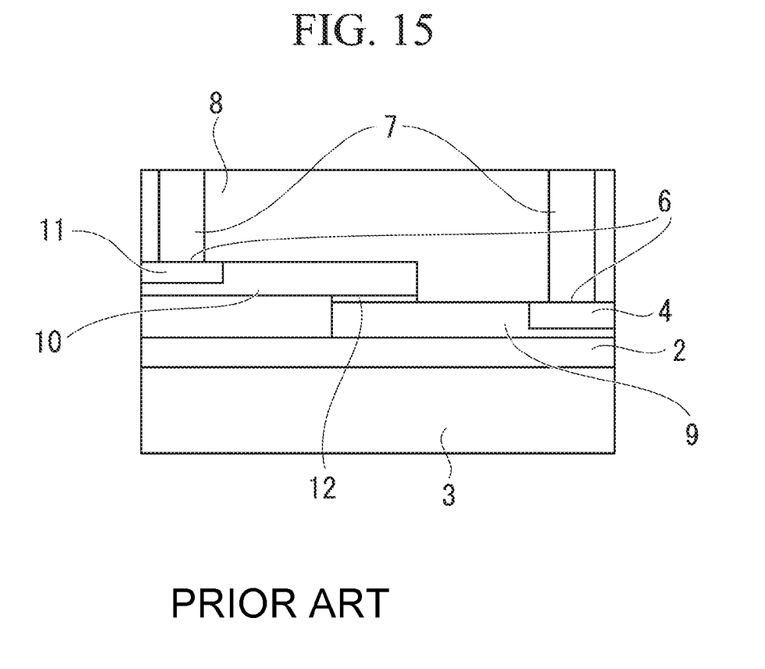
FIG. 15 is a cross-sectional view of a silicon-based electro-optical device disclosed in Patent Document 1.

Further, as another electro-optical modulator, for example, a silicon-based, electro-optical device including a silicon-insulator-silicon (SIS) structure formed on an SOI platform is disclosed in Patent Document 1. The silicon-based electro-optical device disclosed in Patent Document 1 includes n doped polycrystalline silicon 10 serving as a main body region formed on a relatively thin silicon surface layer of an SOI substrate and p doped semiconductor silicon 9 serving as a gate region stacked to partially overlap the n doped polycrystalline silicon 10 as illustrated, in FIG. 15. Further, a relatively thin dielectric layer 12 is formed on a stacked interface between the p doped semiconductor silicon 9 and the n doped poly crystalline silicon 10. The p and n doped polycrystalline silicon 9 and 10 that is subjected to the doping process in the gate region and the main body region is specified such that a change in a carrier density is controlled by an external signal voltage applied via an electrode interconnection 7 and p+ and n+ doped semiconductor silicon 4 and 11.

DOCUMENTS OF THE PRIOR ART

Patent Document

[Patent Document 1]
Japanese Unexamined Patent Application Publication No. 2006-515082

Non-Patent Document

[Non-Patent Document 1]
W. M. Green, M. J. Rooks, L. Sekaric, Y. A. Vlasov, "Ultra-compact, low RF power, 10 Gb/s silicon Mach-Zehnder modulator," Optics Express, The Optical Society, December 2007, Vol. 15, Issue 25, p. 17106-17113

DISCLOSURE OF INVENTION

Problem to be Solved by the Invention

The operation speed of the silicon-based electro-optical device disclosed in Non-Patent Document 1 is limited by the lifespan of free carriers in the intrinsic semiconductor silicon 1 and carrier diffusion when a forward bias is removed. As described above, the PIN diode modulator of the related art commonly has the operation speed within a range of 10 to 50 Mbps at the time of a forward bias operation. On the other hand, the switching speed can be increased by introducing impurities into the intrinsic semiconductor silicon 1 in order to shorten the lifespan of carriers, but the introduced impurities lower the optical modulation efficiency. Further, the largest factor influencing the operation speed of the PIN diode modulator is an RC time constant, and in the case of the rib waveguide structure, capacitance (C) when a forward bias is applied greatly increases as a carrier depletion layer of a PN junction portion decreases. Theoretically, the high-speed operation of the PN junction portion can be achieved by applying a reverse bias, but there is a problem in that a drive voltage becomes relatively high, or the size of the silicon-based electro-optical device is increased.

In addition, in the silicon-based electro-optical device disclosed in Patent Document 1, it is desirable that a region in which an optical signal electric field is dynamically controlled externally be identical to a region in which a carrier density is dynamically controlled externally. When the region in which the optical signal electric field is externally controlled is identical to the region in which the carrier density is externally controlled, optical phase modulation is performed by accumulation, removal, or inversion of the free carriers at both sides of the dielectric layer 12. However, practically, the thickness of the region in which the carrier density is dynamically changed is greatly decreased to about several nanometers (nm). For this reason, the optical phase modulation length of a millimeter (mm) order is necessary, and there is consequently a problem in that the size of the silicon-based electro-optical device increases, and it is difficult to perform the high-speed operation.

The present invention was made in order to solve the above-mentioned problems, and it aims to provide a silicon-based electro-optical device which can be integrated on a silicon substrate and is capable of implementing an optical modulator structure based on a carrier plasma effect, and which is capable of achieving a low current density, low power consumption, a high degree of modulation, low voltage driving, and high-speed modulation in a submicron region, at a low cost.

Means for Solving the Problem

A silicon-based electro-optical device of the present invention has a structure in which at least one of a silicon semiconductor layer doped to have a first conductive type and a silicon semiconductor layer doped to have a second conductive type is stacked, wherein in an SIS junction in which a relatively thin dielectric is formed on an interface between the stacked semiconductor layers, a free carrier concentration working on an optical signal electric field is modulated as free carriers are accumulated, removed, or inverted at both sides of a relatively thin dielectric by electrical signals from electric terminals connected to the first and second doped region, and in a region in which the silicon semiconductor layers having the first and second conductive types are stacked, a concavoconvex structure formed of a $Si_{1-x}Ge_x$ (x=0.01 to 0.9) layer is formed on a surface of the first conductive type silicon semiconductor layer, the relatively thin dielectric is formed on the concavoconvex, and the silicon semiconductor layer having the second conductive type is further stacked.

Effects of the Invention

According to the silicon-based electro-optical device of the present invention, an optical modulator structure based on a carrier plasma effect, which is capable of achieving a low current density, low power consumption, a high degree of modulation, low voltage driving, and high-speed modulation in a submicron region, can be implemented at a low cost.

EMBODIMENTS FOR CARRYING OUT THE INVENTION

Hereinafter, silicon-based electro-optical devices and Mach-Zehnder interferometer type structures according to exemplary embodiments of the present invention will be described in detail with reference to the appended drawings.

In drawings used in the following description, in order to help understand features, there are cases in which only portions having features are enlarged and illustrated for convenience, and dimension ratios of respective components or the like are not limited to be the same as actual ones.

The silicon-based electro-optical devices according to embodiments of the present invention illustrated in FIGS. 1 to 13 use an electro-optical effect (free carrier plasma effect). An overview of an optical phase modulation mechanism in silicon that is an operation principle in the silicon-based electro-optical device of the present invention will be described below.

(Overview of Free Carrier Plasma Effect)

Since there is little to no pure electro-optical effect in silicon as described above, only the free carrier plasma effect and the thermo-optical effect are used for optical modulation operation of the silicon-based electro-optical device. In other words, in the silicon-based electro-optical device, in order to implement the high-speed operation of Gbps or more that is desired to be achieved by the present invention, only the free carrier plasma effect is effective. The free carrier plasma effect is described by primary approximate values of the following Formulas (1) and (2).

$$\Delta n = -\frac{e^2 \lambda^2}{8\pi^3 c^3 \varepsilon_0 n}\left(\frac{\Delta N_e}{m} + \frac{\Delta N_h}{m}\right) \quad (1)$$

$$\Delta k = -\frac{e^2 \lambda^2}{8\pi^3 c^3 \varepsilon_0 n}\left(\frac{\Delta N_e}{m_e^2 \mu_e} + \frac{\Delta N_h}{m_h^2 \mu_h}\right) \quad (2)$$

In Formulas (1) and (2), $\Delta n$ and $\Delta k$ indicate a real part and an imaginary part of a change in a refractive index of a silicon semiconductor layer, e indicates charges, $\lambda$ indicates a wavelength of light, $\varepsilon_0$ indicates a dielectric constant in a vacuum, n indicates a refractive index of intrinsic semiconductor silicon, $m_e$ indicates an effective mass of electron carriers, $m_h$ indicates an effective mass of hole carriers, $\mu_e$ indicates mobility of electron carriers, $\mu_h$ indicates mobility of hole carriers, $\Delta N_e$ indicates a change in a concentration of electron carriers, and $\Delta N_h$ indicates a change in a concentration of hole carriers.

In a $Si_{1-x}Ge_x$ (x=0.01 to 0.9) layer (hereinafter referred to simply as a "$Si_{1-x}Ge_x$ layer"), as a composition x of Gs is increased, an effective mass of electron and hole carriers is decreased, and a large amount of change in a refractive index can be obtained. An imaginary part of a refractive index, that is, an optical absorption coefficient, is increased as well. Thus, in an electro-optical modulator, it is important to form the $Si_{1-x}Ge_x$ layer in a concavoconvex shape, improve overlapping between a region in which a free carrier density is changed and an optical field, and decrease the length of an active layer.

The $Si_{1-x}Ge_x$ layer has a larger refractive index than a silicon semiconductor layer, and has an effect of improving overlapping between a region in which a free carrier density is changed and an optical field. In addition, as the $Si_{1-x}Ge_x$ layer is formed in the concavoconvex shape, the length of the active layer can be remarkably reduced.

Further, as a composition of Ge in the $Si_{1-x}Ge_x$ layer is increased, the free carrier plasma effect is further enhanced. In wavelengths of 1310 nm and 1550 nm used in an optical communication system, in order to avoid optical absorption caused by electronic energy transition in the $Si_{1-x}Ge_x$ layer, it is desirable to set the composition x of Ge to 0.01 to 0.9. Further, as distortion is applied to the $Si_{1-x}Ge_x$ layer, the effective mass of electron and hole carriers is decreased, and a large free carrier plasma effect can be obtained.

An experimental evaluation of an electro-optical effect in silicon has been performed, and a change in a refractive index with respect to a carrier density at wavelengths of 1310 nm and 1550 nm used in an optical communication system is known to match the Drude equation well. Further, in an electro-optical modulator using an optical operation based on the Drude equation, an amount of change in a phase is defined as in the following Formula (3):

$$\Delta \theta = \frac{2\pi}{\lambda} \Delta n_{eff} L \quad (3)$$

In Formula (3), L indicates the length of the active layer in a light propagation direction of a silicon-based electro-optical device.

In the present invention, an amount of change in a phase is exerted as a large effect compared to optical absorption. A silicon-based electro-optical device which will be described below can basically show a feature as a phase modulator.

Next, the silicon-based electro-optical device of the present invention with an SIS junction using the free carrier plasma effect will be described with reference to FIGS. 1 to 11.

First Embodiment

Figure 1:
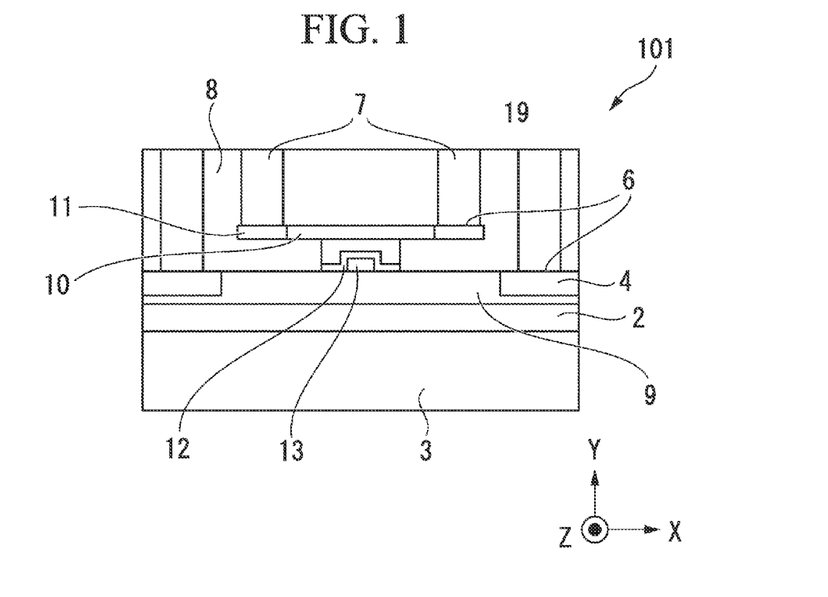
FIG. 1 is a cross-sectional view of a silicon-based electro-optical device according to a first embodiment of the present invention.

FIG. 1 is a cross-sectional view of an electro-optical phase modulator (a silicon-based electro-optical device) 101 according to a first embodiment of the present invention.

The electro-optical phase modulator 101 includes a concavoconvex (hereinafter referred to simply as a "$Si_{1-x}Ge_x$ concavoconvex layer") 13 including a $Si_{1-x}Ge_x$ layer, a relatively thin dielectric layer (dielectric) 12, and n doped polycrystalline silicon (a silicon semiconductor layer having a second conductive type) 10. The electro-optical phase modulator 101 is formed on an SOI substrate on which a support substrate 3, an embedding oxide layer 2, and p doped polycrystalline silicon (a silicon semiconductor layer having a first conductive type) 9 are sequentially stacked. FIG. 1 illustrates n doped polycrystalline silicon 19 as a portion of the n doped polycrystalline silicon 10 coming into contact with the dielectric layer 12.

Here, in the present invention, the relatively thin dielectric layer 12 includes at least one layer made of silicon oxide, silicon nitride, hafnium oxide, zirconium oxide, or aluminum oxide. The relatively thin dielectric layer 12 has a thickness of 0.1 nm to 50 nm. In the relatively thin dielectric, when free carriers are accumulated at both sides of the dielectric layer 12 in the electro-optical phase modulator 101, the modulation efficiency is improved by increasing a dielectric constant and decreasing the thickness. Meanwhile, since an increase in capacitance causes a frequency band to decrease when a high-speed operation is performed, in order to implement a desired modulation efficiency and a high-speed operation, an optimal thickness and material are applied. When the thickness is set to be smaller than 0.1 nm, there is a problem of a leakage current in practice, and when the thickness is set to be larger than 50 nm, the modulation efficiency significantly deteriorates, and thus the thickness is preferably set within a range of 0.1 or more and 50 nm or less.

The $Si_{1-x}Ge_x$ concavoconvex layer 13 is formed on the surface of the p doped semiconductor silicon 9 of the SOI substrate. The composition x of Ge is preferably 0.01 to 0.9 in order to increase the free carrier plasma effect.

The relatively thin dielectric layer 12 is formed on the $Si_{1-x}Ge_x$ concavoconvex layer 13 and a part of the surface of the SOI layer. Thus, not only the top surface but all exposed surfaces including the side surface of the $Si_{1-x}Ge_x$ concavoconvex layer 13 are covered with the dielectric layer 12.

The n doped polycrystalline silicon 10 is stacked to cover the surface concavoconvex above the dielectric layer 12. Further, in order to reduce optical loss, the surface of the n doped polycrystalline silicon 10 may be planarized by polishing.

The p and n doped polycrystalline silicon 9 and 10 is connected with electrode interconnections 7 for externally applying a drive voltage thereto. Further, p+ and n+ doped semiconductor silicon 4 and 11 that has been subjected to a high-concentration doping process is formed on connection portions between the p and n doped polycrystalline silicon 9 and 10 and the electrode interconnections 7. The p+ and n+ doped semiconductor silicon 4 and 11 functions as contacts of the electrode interconnections 7, but contact layers 6 may be formed on interfaces between the p+ and n+ doped semiconductor silicon 4 and 11 and the electrode interconnections 7 as necessary.

Each of the p and n doped polycrystalline silicon 9 and 10 includes at least one layer made of a material selected from the group consisting of polycrystalline silicon, amorphous silicon, strained silicon, single crystalline silicon, and $Si_{1-x}Ge_x$.

In the electro-optical phase modulator 101, the $Si_{1-x}Ge_x$ concavoconvex layer 13 is formed on the SIS junction interface, and thus overlapping between an optical field and a carrier density modulation region is increased. Further, as the $Si_{1-x}Ge_x$ layer 13 is employed, a larger carrier plasma effect than in the silicon semiconductor layer is obtained, and thus the size of the electro-optical phase modulator 101 can be reduced. Further, as the doping density of the p and n doped polycrystalline silicon 9 and 10 adjacent to the SIS junction interface is further increased, a series resistance component can be decreased, and thus an RC time constant can be reduced.

Further, in the electro-optical phase modulator 101, in order to reduce optical absorption loss by overlapping the region in which the doping density of the p and n doped polycrystalline silicon 9 and 10 is increased and an optical field, the SIS junction portion is formed in a waveguide shape having a rib/ridge shape illustrated in FIG. 1. Through the structure in which the doping density of the slab region is increased, it is possible to implement the electro-optical phase modulator that is small in light loss and an RC time constant and can perform a high-speed operation.

As described above, the concavoconvex formed on the SIS junction interface is implemented such that the $Si_{1-x}Ge_x$ concavoconvex layer 13 is formed on the surface of the p doped semiconductor silicon 9, the dielectric layer 12 is then formed, and the n doped polycrystalline silicon 10 is stacked and formed above the dielectric layer 12. Preferably, an interval (period) of the concavoconvex in the $Si_{1-x}Ge_x$ concavoconvex layer 13 is 2W or less when W is a thickness (hereinafter, a maximum depletion layer thickness) of a semiconductor layer in which tree carriers are accumulated, removed, or inverted at both side of the dielectric layer 12. An effect of improving the modulation efficiency is obtained even when the interval is 2W or more, but it is preferable that the interval be 2W or less in order to further increase the effect of improving the modulation efficiency.

The maximum depletion layer thickness W in a thermal equilibrium state is obtained as in the following Formula (4).

$$W = 2\sqrt{\frac{\varepsilon_s kT \cdot \ln(N_c/n_i)}{e^2 N_c}} \qquad (4)$$

In Formula (4), $\varepsilon_s$ indicates a dielectric constant of a semiconductor layer, k indicates a Boltzmann's constant, $N_c$ indicates a carrier density, $n_i$ indicates an intrinsic carrier concentration, and e indicates a charge amount. For example, when $N_c$ is $10^{17}/cm^3$, the maximum depletion layer thickness is about 0.1 μm, and as the carrier density is increased, the depletion layer thickness, that is, the thickness of a region in which carrier density modulation is performed, is decreased.

Meanwhile, the height of the concavoconvex in the $Si_{1-x}Ge_x$ concavoconvex layer 13 is preferably $\lambda/n_{eff}$ or less when $n_{eff}$ is an effective refractive index working on an optical signal electric field in the electro-optical phase modulator 101, and λ is a wavelength of an optical signal. When this condition is satisfied, the overlapping between the optical field and the region in which the carrier density modulation is performed becomes maximum, and highly efficient optical phase modulation is implemented.

When the interval of the concavoconvex shape of the $Si_{1-x}Ge_x$ concavoconvex layer 13 is set to be 2W or less, and the height of the concavoconvex shape is set to be $\lambda/n_{eff}$ or less as described above, reflection of an optical signal is suppressed, and regions in which there is peak intensity of an optical signal electric field overlap in a region in which tree carriers are accumulated, removed, or inverted at both sides of the dielectric layer 12, and thus the highest optical modulation efficiency is obtained.

Figure 2:
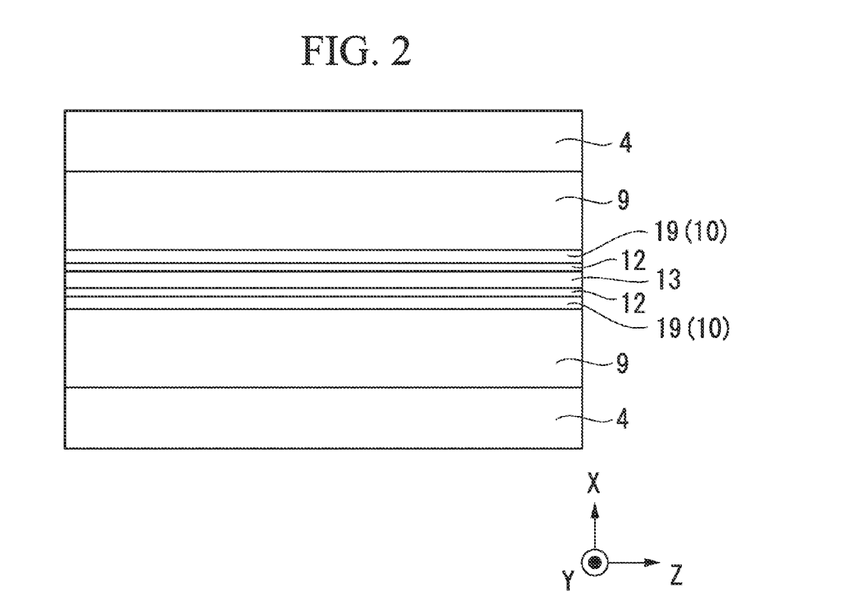
FIG. 2 is a plan view of a silicon-based electro-optical device according to the first embodiment of the present invention in a light propagation direction.

FIG. 2 is a plane view of the electro-optical phase modulator 101 illustrated in FIG. 1 in the light propagation direction (a Z direction in FIG. 1). In the electro-optical phase modulator of the related art, when an electrical signal is applied as a drive voltage, accumulation, depletion, or inversion of carriers occurs at both sides of a relatively thin dielectric layer. In this case, the thickness of a region in which the carrier density is modulated is estimated to be 100 nm or less. Thus, there is a problem in that an optical signal electric field is large, but a region in which the carrier density is modulated is very small, and modulation efficiency is generally poor. In the electro-optical phase modulator 101 of the present embodiment, the region of the concavoconvex shape including the $Si_{1-x}Ge_x$ layer 13 in which the shape of the SIS junction is formed on the surface of the p doped semiconductor silicon 9 is formed as the region in which the carrier density modulation is performed, and thus it is possible to effectively increase the area of the region, improve the overlapping with the optical signal electric field, and obtain the high modulation efficiency.

Second Embodiment

Figure 3:
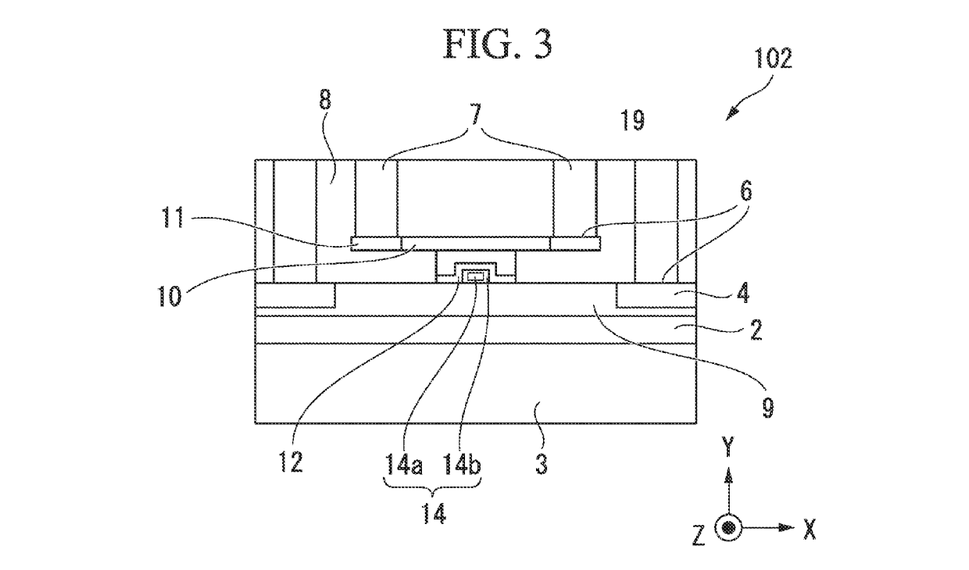
FIG. 3 is a cross-sectional view of a silicon-based electro-optical device according to a second embodiment of the present invention.

Next, FIG. 3 is a cross-sectional view of an electro-optical phase modulator 102 according to a second embodiment of the present invention. In configurations of electro-optical phase modulators according to second to fifth embodiments, the same components as in the electro-optical phase modulator 101 according to the first embodiment are denoted by the same reference numerals, and a description thereof is omitted.

In the electro-optical phase modulator 102, as illustrated in FIG. 3, a concavoconvex including a stacked structure 14 in which two or more types of $Si_{1-x}Ge_x$ compositions are stacked in a direction perpendicular to a light transmission direction is formed on the surface of the p doped semiconductor silicon 9 of the SOI substrate. FIG. 3 illustrates the stacked structure 14 including two types of $Si_{1-x}Ge_x$ concavoconvex layers 14a and 14b that differ from each other in the composition x of Ge.

When the stacked structure 14 including the two or more types of $Si_{1-x}Ge_x$ concavoconvex layers that differ in the composition of Ge is formed, it is possible to reduce crystal defects when the composition of Ge is increased and implement a layer configuration in which a carrier plasma effect near an interface with the dielectric layer 12 is further improved.

Third Embodiment

Figure 4:
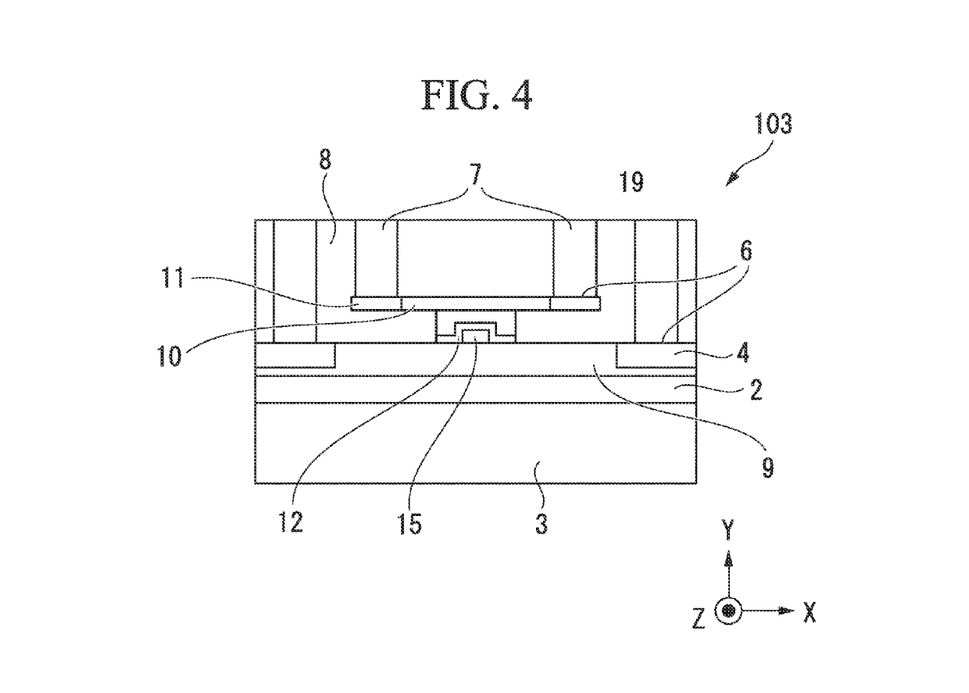
FIG. 4 is a cross-sectional view of a silicon-based electro-optical device according to a third embodiment of the present invention.

Next, FIG. 4 is a cross-sectional view of an electro-optical phase modulator 103 according to a third embodiment of the present invention. In the electro-optical phase modulator 103, as illustrated in FIG. 4, a $Si_{1-x}Ge_x$ concavoconvex layer 15 in which composition modulation is performed in the thickness direction is formed on the surface of an SOI layer. As the composition of $Si_{1-x}Ge_x$ is modulated in the thickness direction, it is possible to reduce crystal defects when the composition x of Ge is increased and implement a layer configuration in which a carrier plasma effect near an interface with the dielectric layer 12 is further improved.

Fourth Embodiment

Figure 5:
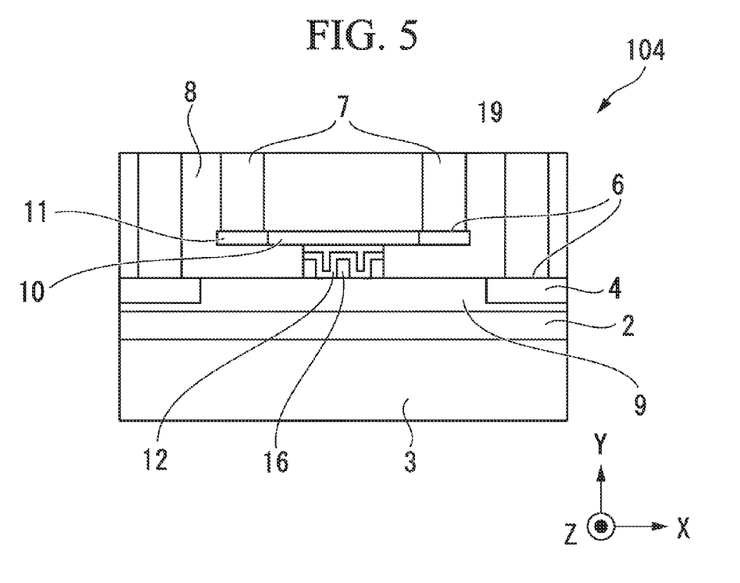
FIG. 5 is a cross-sectional view of a silicon-based electro-optical device according to a fourth embodiment of the present invention.

Next, FIG. 5 is a cross-sectional view of an electro-optical phase modulator 104 according to a fourth embodiment of the present invention. In the electro-optical phase modulator 104, as illustrated in FIG. 5, a concavoconvex of a $Si_{1-x}Ge_x$ concavoconvex layer 16 on the surface of an SOI layer is formed in a direction (an X direction in FIG. 5) vertical to a propagation direction (a Z direction in FIG. 5) of an optical signal. As a result, it is possible to improve the overlapping between the optical field and the carrier modulation region and obtain the high modulation efficiency.

Fifth Embodiment

Figure 6:
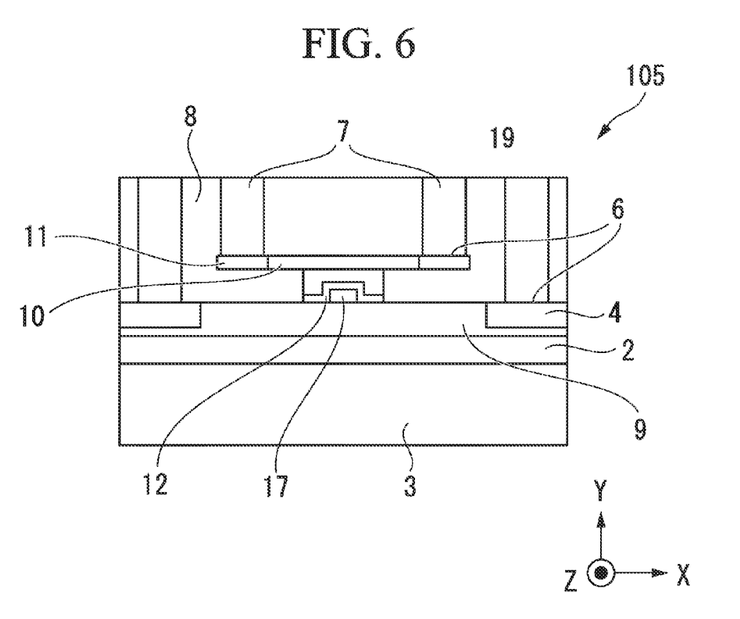
FIG. 6 is a cross-sectional view of a silicon-based electro-optical device according to a fifth embodiment of the present invention.

Next, FIG. 6 is a cross-sectional view of an electro-optical phase modulator 105 according to a fifth embodiment of the present invention. In the electro-optical phase modulator 105, as illustrated in FIG. 6, a concavoconvex of a $Si_{1-x}Ge_x$ concavoconvex layer 17 on the surface of an SOI layer is formed in a direction (a Z direction in FIG. 6) parallel to a propagation direction of an optical signal.

Figure 7:
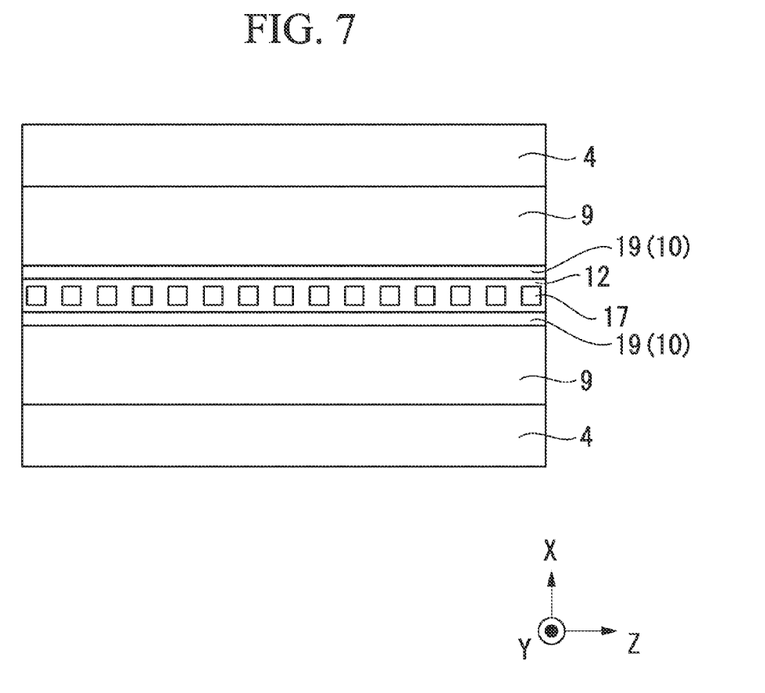
FIG. 7 is a plane view of a silicon-based electro-optical device according to the fifth embodiment of the present invention in a light propagation direction.
Figure 8:
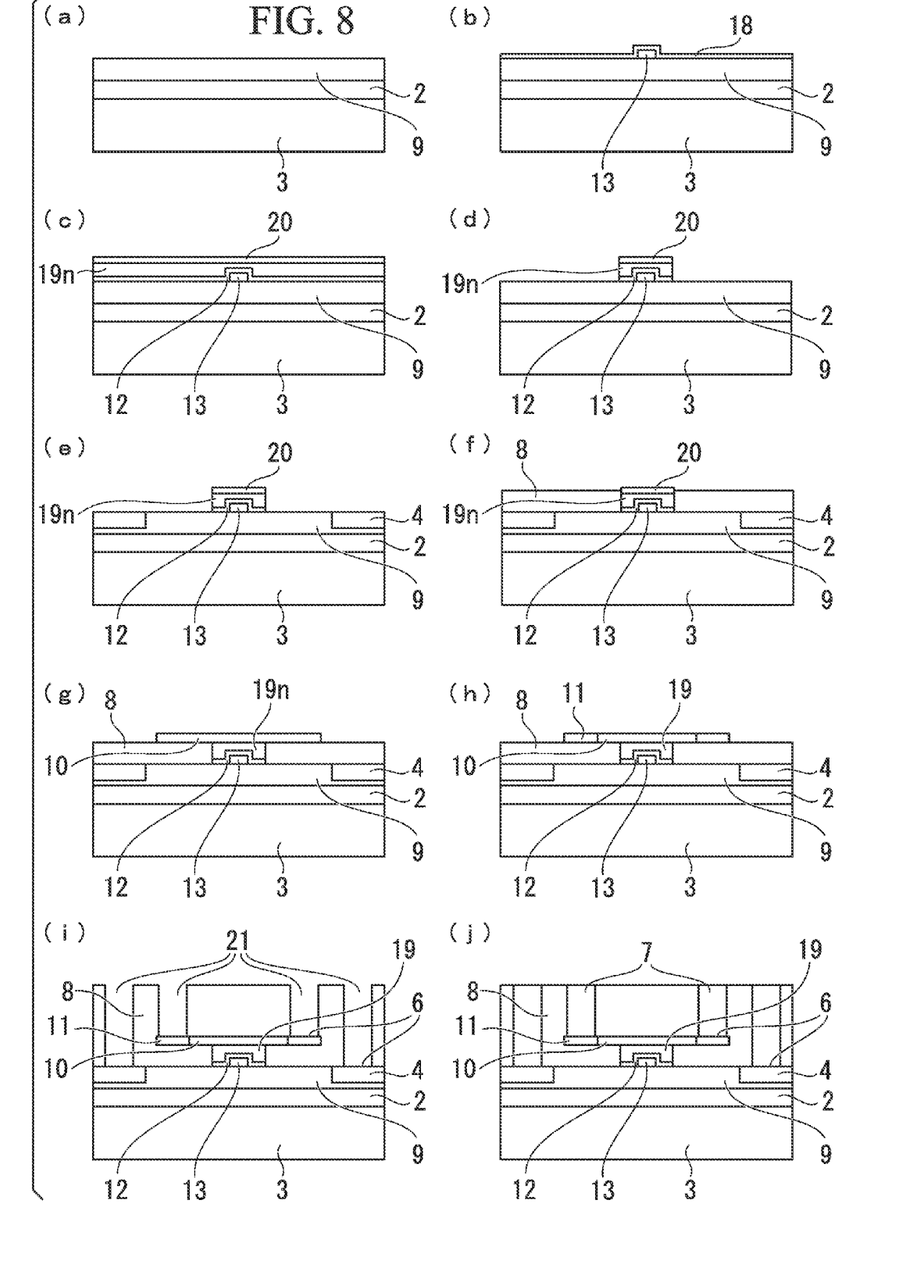
FIGS. 8(a) to 8(j) are cross-sectional views illustrating a method of manufacturing the silicon-based electro-optical device according to the first embodiment of the present invention.

FIG. 7 is a plane view of the electro-optical phase modulator 105 in the light propagation direction. In the electro-optical phase modulator 105, similarly to the electro-optical phase modulator 101, when the thickness of the region in which the carrier density is modulated is set to W, the interval of the concavoconvex shape on the surface is preferably set to be 2W or less. Further, the concavoconvex of the $Si_{1-x}Ge_x$ concavoconvex layer 17 may be periodically formed so that a group speed of an optical signal is delayed. Alternatively, in order to suppress reflection of an optical signal, the concavoconvex may be non-periodically formed so that the interval is $\lambda/n_{eff}$ or less when $n_{eff}$ is an effective refractive index working on an optical signal electric field, and λ is an optical signal wavelength. Through such a concavoconvex structure, it is possible to further improve overlapping between the optical field and the carrier modulation region and obtain the high modulation efficiency.

Next, a method of forming the carrier modulation region of the electro-optical phase modulators according to the first to fifth embodiments will be described with reference to FIGS. 8(a) to 8(j).

FIG. 8(a) is a cross-sectional view of an SOI substrate used to form an electro-optical phase modulator. The SOI substrate has a structure in which p-type doped polycrystalline silicon 9 of about 100 to 1000 nm is stacked on an embedding oxide layer 2 on a support substrate 3 as illustrated in FIG. 8(a). In order to reduce light loss, it is desirable to use a structure in which the thickness of the embedding oxide layer is 1000 nm or more. For the p-type doped polycrystalline silicon 9 on the embedding oxide layer 2, a substrate that has been subjected to a doping process to have a first conductive type (p type) may be used, or phosphorus (P) or boron (B) that is a p type dopant may be doped into a surface layer by ion injection or the like, and then a thermal process may be performed.

Then, as illustrated in FIG. 8(b), an oxide film mask 18 used to form a concavoconvex including a $Si_{1-x}Ge_x$ layer is formed on the p-type doped polycrystalline silicon 9 by a deposition technique such as a low-pressure chemical vapor deposition (LPCVD) technique. Thereafter, for example, an opening pattern having a width of about 200 nm is formed on an optical modulation portion by optical lithography or electron beam lithography. Thereafter, a $Si_{1-x}Ge_x$ concavoconvex layer 13 having a height of about 50 to 100 nm is selectively grown on the opening pattern by an ultra-high vacuum chemical vapor deposition (UHV/CVD) technique or an LPCVD technique.

Then, as illustrated in FIG. 8(c), for example, a relatively thin dielectric layer 12 made of $SiO_2$ of about 5 nm is formed by a thermal oxidation process. Thereafter, non-doped polycrystalline silicon 19n that is not doped is formed on the dielectric layer 12 to sufficiently cover the concavoconvex by a CVD technique or a sputtering technique. In this process, a concavoconvex is transferred onto and formed on the non-doped polycrystalline silicon 19n due to the concavoconvex on the SOI. Then, a hard mask layer 20 made of $SiN_x$ is formed on the non-doped polycrystalline silicon 19n by a deposition technique such as an LPCVD technique.

Then, as illustrated in FIG. 8(d), the hard mask layer 20 is patterned by optical lithography or electron beam lithography. Further, the non-doped polycrystalline silicon 19n is processed in a rib waveguide shape by a reactive plasma etching technique or the like using the formed pattern so that a width of an optical waveguide structure in the optical modulation portion is 0.3 μm or more and 2 μm or less.

Then, as illustrated in FIG. 8(e), p+ doped semiconductor silicon 4 is formed on the p-type doped polycrystalline silicon 9 that is an SOI layer by an ion injection technique.

Then, as illustrated in FIG. 8(f), an oxide film clad layer 8 is formed by a deposition technique such as a plasma CVD technique, and planarized by a chemical mechanical polishing (CMP) technique.

Then, as illustrated in FIG. 8(g), a polycrystalline silicon layer serving as an upper electrode lead-out layer is stacked, and subjected to a doping process by n-type ion injection together with the non-doped polycrystalline silicon 19n to have n-type conductivity. The non-doped polycrystalline silicon 19n may be subjected to a doping process to have n-type conductivity during deposition.

Then, as illustrated in FIG. 8(h), n+ doped polycrystalline silicon 11 is formed on the upper electrode lead-out layer of the n doped polycrystalline silicon 10 by ion injection.

Then, as illustrated in FIG. 8(i), the oxide film clad layer 8 is stacked by a plasma CVD technique or the like, a contact hole 21 is formed by reactive etching, and then electrode contact layers 6 are formed on the surfaces of the p+ doped semiconductor silicon 4 and the n+ doped polycrystalline silicon 11. In this process, the electrode contact layer 6 may be formed such that a metal such as Ni is stacked on a semiconductor silicon layer, and a silicide layer or the like is formed by an annealing technique.

Then, as illustrated in FIG. 8(j), a metallic layer such as Ti/TiN/Al (Cu) or Ti/TiN/W is formed to fill the contact hole 21 by a sputtering technique or a CVD technique, and patterned into an electrode interconnection 7 by reactive etching. As the electrode interconnection 7 is formed, a connection with a driving circuit is possible.

Next, the Mach-Zehnder interferometer type structure of the present invention will be described.

Figure 9:
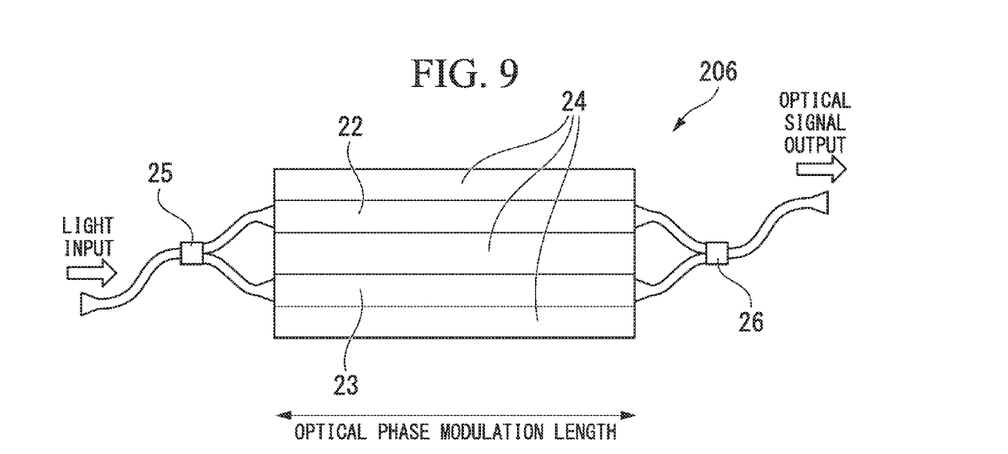
FIG. 9 is a plane view for explaining a Mach-Zehnder interferometer type structure according to a sixth embodiment of the present invention.

FIG. 9 is a configuration diagram of an MZM type optical intensity modulator (a Mach-Zehnder interferometer type structure) 206 according to a sixth embodiment of the present invention. The MZM type optical intensity modulator 206 includes a first arm 22 and a second arm 23 in which electro-optical phase modulators according to any one of the first to fifth embodiments are arranged in parallel, and is connected to an optical splitting structure 25 that splits light at an input side of the first and second arms 22 and 23 and an optical coupling structure 26 that couples light at an output side. In the MZM type optical intensity modulator 206, input light is converted into an optical intensity modulation signal such that phase modulation of an optical signal is performed in the first and second arms 22 and 23, and then phase interference is performed by the optical coupling structure 26.

In the MZM type optical intensity modulator 206, input light is split by the optical splitting structure 25 arranged at the input side so that the first and second arms 22 and 23 are equal in power. Here, as a positive voltage is applied, to the first arm 22, carrier accumulation is performed at both sides of the dielectric layer of the electro-optical phase modulator, and as a negative voltage is applied to the second arm, carriers at both sides of the dielectric layer are removed. As a result, in a carrier accumulation mode, the refractive index working on the optical signal electric field in the electro-optical device is decreased, and in a carrier removal (depletion) mode, the refractive index working on the optical signal electric field is increased, and an optical signal phase difference between the arms becomes maximum. The optical signals transmitted through both arms are combined by the optical coupling structure at the output side, and optical intensity modulation is performed.

According to the MZM type optical intensity modulator 206 having the above configuration, optical intensity modulation can be performed on input light at a low current density, low power consumption, a high degree of modulation, low voltage driving, and high-speed modulation.

Figure 10:
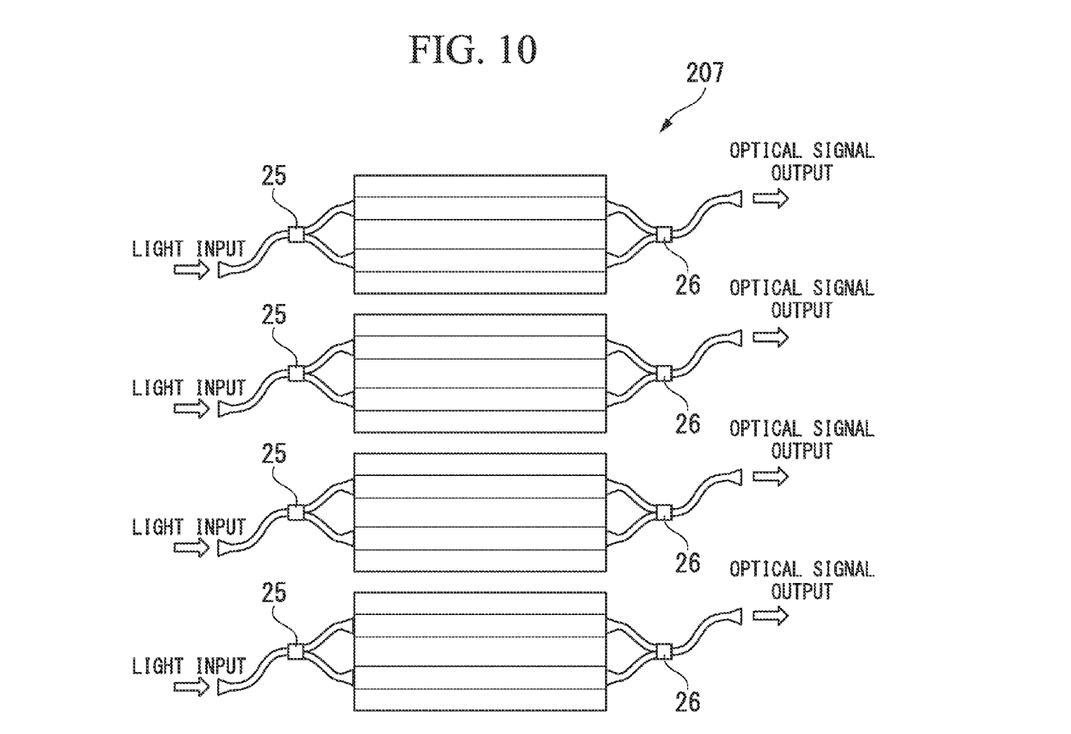
FIG. 10 is a plane view for explaining a Mach-Zehnder interferometer type structure according to the seventh embodiment of the present invention.

FIG. 10 is a configuration diagram of an MZM type optical intensity modulator 207 according to a seventh embodiment of the present invention. The MZM type optical intensity modulator 207 has a configuration in which the MZM type optical intensity modulators 206 are arranged in parallel as illustrated in FIG. 10.

Through this configuration, the same effects as in the MZM type optical intensity modulator 206 are obtained, and a parallel process can be performed in optical intensity modulation of input light.

Figure 11:
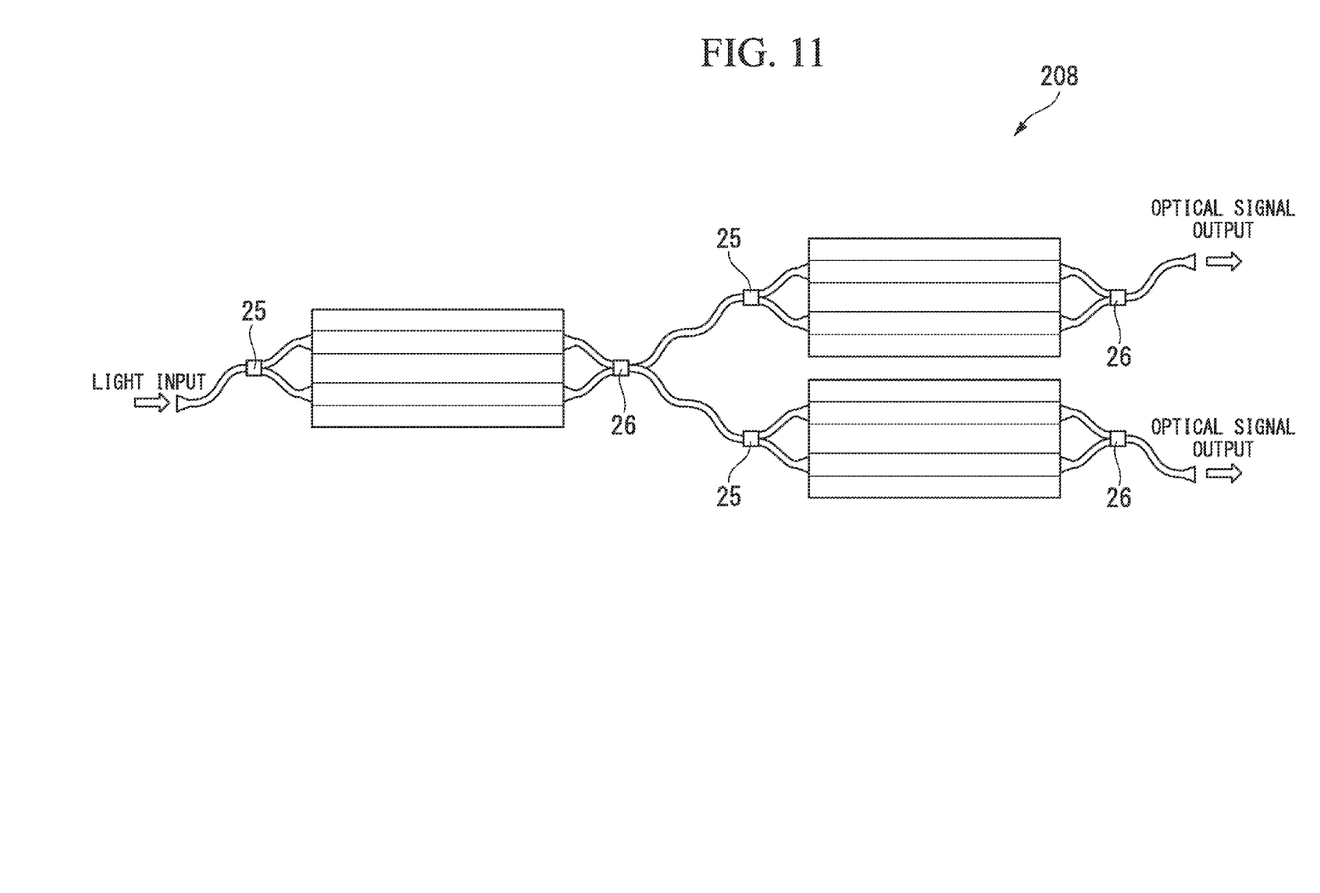
FIG. 11 is a plane view for explaining a Mach-Zehnder interferometer type structure according to the eighth embodiment of the present invention.

FIG. 11 is a configuration diagram of an MZM type optical intensity modulator 208 according to an eighth embodiment of the present invention. The MZM type optical intensity modulator 208 has a configuration in which a plurality of MZM type optical intensity modulators 206 or a plurality of MZM type optical intensity modulators 207 are arranged in series as illustrated in FIG. 11.

Through this configuration, the MZM type optical intensity modulators 207 and 208 can be applied to, for example, an optical modulator or a matrix optical switch having a high transfer rate.

Although exemplary embodiments of the present invention have been described in detail above, the present invention is not limited to a specific embodiment, and various modifications or changes can be made within the scope of the gist of the present invention set forth in the appended claims.

EXAMPLES

Next, concrete examples will be described.

Example 1

The electro-optical phase modulator 101 according to the first embodiment was manufactured by the process illustrated in FIGS. 8A to 8J. At the time of manufacturing, a wavelength λ of input light was set to 1550 nm, and the other conditions were appropriately set in view of the wavelength.

Further, the thickness W of the semiconductor layer in which free carriers were accumulated, removed, or inverted at both sides of the dielectric layer 12 was set to 160 nm, and the interval of the concavoconvex of the $Si_{1-x}Ge_x$ concavoconvex layer 13, like W, was set to about 160 nm or less.

Comparative Example 1

The electro-optical phase modulator was manufactured under the same conditions as in Example 1 except that no concavoconvex was formed on the $Si_{1-x}Ge_x$ concavoconvex layer 13.

Figure 12:
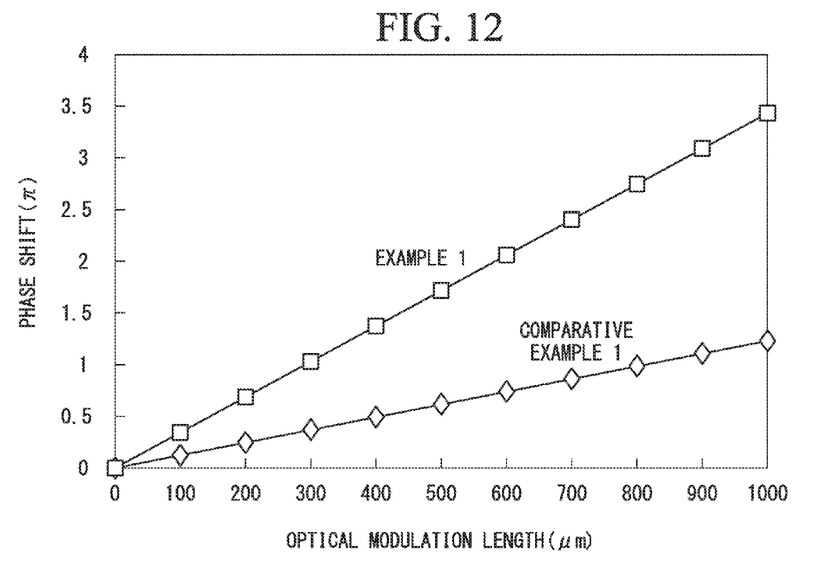
FIG. 12 is a graph illustrating the dependence of an optical phase shift amount on a length in an optical signal propagation direction in a silicon-based electro-optical device manufactured according to Example 1.

FIG. 12 illustrates the dependence of the phase shift amount on the length in the optical signal propagation direction in the electro-optical phase modulators manufactured according to Example 1 and Comparative example 1. When the concavoconvex was formed at the interval of about 160 nm or less which is the same as the carrier-modulated thickness W, it was confirmed that the optical modulation efficiency was remarkably improved in the electro-optical phase modulator of Example 1. It was confirmed that as the depth of the concavoconvex of the $Si_{1-x}Ge_x$ concavoconvex layer 13 was increased, the optical modulation efficiency was improved.

Figure 13:
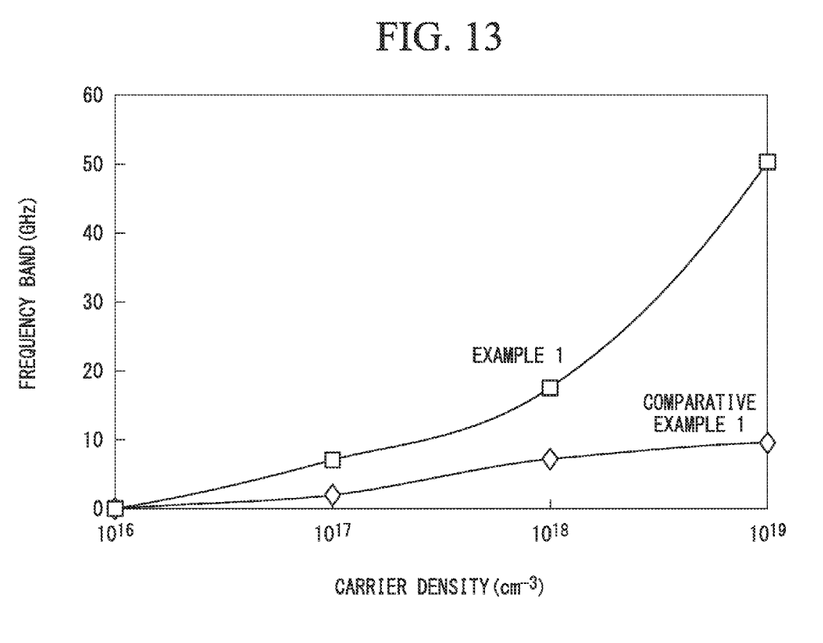
FIG. 13 is a graph illustrating the dependence of an operation frequency band on a carrier density in the silicon-based electro-optical device manufactured according to Example 1.

FIG. 13 illustrates the dependence of the operation frequency band on the carrier density in the electro-optical phase modulators manufactured according to Example 1 and Comparative example 1. The operation frequency band for optical phase modulation is in a tradeoff relationship with the size reduction effect by the improvement in the modulation efficiency and influence of the capacitance increase by forming of the concavoconvex. Basically, if an effective refractive index working on an optical signal electric field is $n_{eff}$, and an optical signal wavelength is $\lambda$, the frequency band is increased when the depth of the concavoconvex is $\lambda/n_{eff}$ or less, but it was confirmed that it was possible to perform a high-speed operation of 10 GHz or more by setting the carrier density to about $1^{18}/cm^3$.

In addition, in order to further improve the frequency band, the mobility and the lifespan of carriers are very important. Particularly, the carrier mobility in the polycrystalline silicon layer is a problem in performing the high-speed operation. Thus, it is effective to improve the carrier mobility by increasing a particle diameter by recrystallization through an annealing process or to improve the crystal quality of the n doped polycrystalline silicon 10 using an epitaxial lateral growth (ELO) technique or the like.

Example 2

The MZM type optical intensity modulator 206 according to the sixth embodiment was manufactured using the electro-optical phase modulator manufactured according to Example 1.

In the manufactured MZM type optical intensity modulator, it was confirmed that it was possible to perform optical intensity modulation of 40 Gbps or more, which is the same as in a practical optical communication system and transmission of a modulated optical signal.

Priority is claimed on Japanese Patent Application No. 2012-80451, filed Mar. 30, 2012, the content of which is incorporated herein by reference.

INDUSTRIAL APPLICABILITY

It is possible to provide a silicon-based electro-optical device capable of implementing an optical modulator structure based on a carrier plasma effect, which is capable of achieving a low cost, a low current density, low power consumption, a high degree of modulation, low voltage driving, and high-speed modulation in a submicron region.

DESCRIPTION OF REFERENCE SYMBOLS

1 Intrinsic semiconductor silicon
2 Embedding oxide layer
3 Support substrate
4 P+ doped semiconductor silicon
6 Contact layer
6A First contact layer
6B Second contact layer
7 Electrode interconnection
8 Oxide film clad layer
9 P doped semiconductor silicon
10 N doped polycrystalline silicon
11 N+ doped polycrystalline silicon
12 Dielectric layer
13 $Si_{1-x}Ge_x$ concavoconvex layer (concavoconvex including $Si_{1-x}Ge_x$ (x=0.01 to 0.9) layer)
14 Concavoconvex including stacked structure of two or more types of $Si_{1-x}Ge_x$ compositions
15 Concavoconvex including $Si_{1-x}Ge_x$ layer having modulated composition
16 $Si_{1-x}Ge_x$ concavoconvex layer (concavoconvex including $Si_{1-x}Ge_x$ (x=0.01 to 0.9) layer)
17 $Si_{1-x}Ge_x$ concavoconvex layer (concavoconvex including $Si_{1-x}Ge_x$ (x=0.01 to 0.9) layer)
18 Oxide film mask
19 N doped polycrystalline silicon
19n Non-doped polycrystalline silicon
20 $SiN_x$ hard mask layer
22 First arm
23 Second arm
24 Electrode pad for electro-optical device driving
25 Optical splitting structure
26 Optical coupling structure

The invention claimed is:

1. A silicon-based electro-optical device, comprising:
structure in which at least one of a first silicon semiconductor layer doped to have a first conductive type and a second silicon semiconductor layer doped to have a second conductive type is stacked,
wherein, in an SIS junction in which the relatively thin dielectric layer is formed on an interface between the stacked first silicon semiconductor layer and the second silicon semiconductor layer, a free carrier concentration working on an optical signal electric field is modulated as free carriers are accumulated, removed, or inverted at both sides of a relatively thin dielectric layer by electrical signals from electric terminals connected to the first and second silicon semiconductor layer, and
in a region in which the first and second silicon semiconductor layers having the first and second conductive types are stacked,
a concavoconvex structure including a $Si_{1-x}Ge_x$ (x=0.01 to 0.9) layer is formed on a surface of the first silicon semiconductor layer, the relatively thin dielectric layer is formed on the concavoconvex structure, and the second silicon semiconductor layer having the second conductive type is further stacked.

2. The silicon-based electro-optical device according to claim 1, wherein the concavoconvex structure formed of the $Si_{1-x}Ge_x$ (x=0.01 to 0.9) layer formed on the surface of the first silicon semiconductor layer has a stacked structure of at least two or more types of $Si_{1-x}Ge_x$ (x=0.01 to 0.9) compositions.

3. The silicon-based electro-optical device according to claim 1, wherein the concavoconvex structure including the $Si_{1-x}Ge_x$ (x=0.01 to 0.9) layer formed on the surface of the first silicon semiconductor layer has a structure in which a composition of $Si_{1-x}Ge_x$ (x=0.01 to 0.9) is modulated in a thickness direction.

4. The silicon-based electro-optical device according to claim 1, wherein the concavoconvex structure including the $Si_{1-x}Ge_x$ (x=0.01 to 0.9) layer formed on the surface of the first silicon semiconductor layer includes at least two or more types of $Si_{1-x}Ge_x$ (x=0.01 to 0.9) compositions.

5. The silicon-based electro-optical device according to claim 1, wherein the concavoconvex structure including the $Si_{1-x}Ge_x$ (x=0.01 to 0.9) layer formed on the surface of the first silicon semiconductor layer includes a $Si_{1-x}Ge_x$ (x=0.01 to 0.9) layer having lattice distortion.

6. The silicon-based electro-optical device according to claim 1, wherein the concavoconvex structure including the $Si_{1-x}Ge_x$ (x=0.01 to 0.9) layer formed on the surface of the first silicon semiconductor layer is formed in a direction vertical to a propagation direction of an optical signal.

7. The silicon-based electro-optical device according to claim 1, wherein the concavoconvex structure including the $Si_{1-x}Ge_x$ (x=0.01 to 0.9) layer formed on the surface of the first silicon semiconductor layer is formed in a direction parallel to a propagation direction of an optical signal.

8. The silicon-based electro-optical device according to claim 1, wherein an interval of the concavoconvex structure including the $Si_{1-x}Ge_x$ (x=0.01 to 0.9) layer formed on the surface of the first silicon semiconductor layer is 2W or less, where W is a thickness of a semiconductor layer in which free carriers are accumulated, removed, or inverted at both sides of the relatively thin dielectric layer.

9. The silicon-based electro-optical device according to claim 1, wherein a height of the concavoconvex structure including the $Si_{1-x}Ge_x$ (x=0.01 to 0.9) layer formed on the surface of the first silicon semiconductor layer is $\lambda/n_{eff}$ or less, where $n_{eff}$ is an effective refractive index working on an optical signal electric field in the electro-optical device, and $\lambda$ is an optical signal wavelength.

10. The silicon-based electro-optical device according to claim 1, wherein a region in which an optical signal electric field has peak intensity is arranged in a region in which free carriers are accumulated, removed, or inverted at both sides of the relatively thin dielectric layer.

11. The silicon-based electro-optical device according to claim 1, wherein the silicon semiconductor layers doped to have the first and second conductive types include at least one layer made of a material selected from a group comprised of polycrystalline silicon, amorphous silicon, strained silicon, single crystalline silicon, and $Si_{1-x}Ge_x$.

12. The silicon-based electro-optical device according to claim 1, wherein electric terminals formed in a first doped region and a second doped region are arranged to give low series resistance such that optical signal loss is reduced.

13. The silicon-based electro-optical device according to claim 1, wherein a structure in which at least one of a silicon semiconductor layer doped to have the first conductive type and a silicon layer doped to have the second conductive type is stacked in a region in which an optical signal is transmitted has a rib or ridge optical waveguide structure.

14. The silicon-based electro-optical device according to claim 1, wherein a structure in which at least one of a silicon semiconductor layer doped to have the first conductive type and a silicon layer doped to have the second conductive type is stacked in a region in which an optical signal is transmitted has a slab optical waveguide structure.

15. The silicon-based electro-optical device according to claim 1, wherein at least one electrical modulation signal is applied to at least one of a first electric terminal and a second electric terminal as an input, and converted into an optical modulation signal.

16. The silicon-based electro-optical device according to claim 1, further comprising:
a Mach-Zehnder interferometer type structure comprising first and second arms in which the silicon-based electro-optical devices are arranged in parallel,
an optical splitting structure connected to an input side of the first and second arms, and
an optical coupling structure connected to an output side of the first and second arms,
wherein phase modulation of an optical signal is performed in the first and second arms, and
conversion into an optical intensity modulation signal is performed as phase interference is performed by the optical coupling structure.

17. The silicon-based electro-optical device according to claim 16, wherein the first arm and the second arm have an asymmetric configuration.

18. The silicon-based electro-optical device according to claim 16, wherein the optical splitting structure provides the first arm and the second arm with an input signal distribution ratio other than 1:1.

19. The Mach-Zehnder interferometer type structure according to claim 16, comprising a plurality of individual interferometers arranged according to a certain combination.

20. The Mach-Zehnder interferometer type structure according to claim 19, wherein a plurality of Mach-Zehnder interferometers are arranged in parallel.

21. The Mach-Zehnder interferometer type structure according to claim 19, wherein a plurality of Mach-Zehnder interferometers are arranged in series.

22. The silicon-based electro-optical device according to claim 1, wherein the relatively thin dielectric layer includes at least one layer made of silicon oxide, silicon nitride, hafnium oxide, zirconium oxide, or aluminum oxide.

23. The silicon-based electro-optical device according to claim 1, wherein a thickness of the relatively thin dielectric layer is 0.1 nm or more and 50 nm or less.

* * * * *